United States Patent [19]

Jacob et al.

[11] Patent Number: 5,156,462

[45] Date of Patent: Oct. 20, 1992

[54] BALL GUIDE

[76] Inventors: Werner Jacob, Briandring 29, 6000 Frankfurt am Main 70; Helmut Basener, Nageleshofstrasse 24, 7080 Aalen-Hofherrnweiler, both of Fed. Rep. of Germany

[21] Appl. No.: 740,904

[22] Filed: Aug. 6, 1991

[30] Foreign Application Priority Data

Aug. 7, 1990 [DE] Fed. Rep. of Germany ....... 4025011

[51] Int. Cl.$^5$ .................................................. F16C 31/04
[52] U.S. Cl. ....................................... 384/49; 384/523; 384/526
[58] Field of Search ................. 384/49, 526, 534, 523, 384/528, 576

[56] References Cited

U.S. PATENT DOCUMENTS

| 2,566,421 | 9/1951 | Lapointe . | |
| 2,883,244 | 4/1959 | Berger | 384/49 |
| 4,720,197 | 1/1988 | Scharting et al. | 384/49 |

FOREIGN PATENT DOCUMENTS

| 955010 | 12/1956 | Fed. Rep. of Germany . |
| 1425015 | 1/1969 | Fed. Rep. of Germany . |
| 3635261 | 7/1987 | Fed. Rep. of Germany . |
| 1372144 | 10/1963 | France . |
| 459672 | 9/1968 | Switzerland . |

Primary Examiner—Lenard A. Footland
Attorney, Agent, or Firm—Harness, Dickey & Pierce

[57] ABSTRACT

A ball guide (1) has a cage (6) which is produced by coiling a strip (8). The strip (8) is pre-manufactured and includes apertures (9) to retain balls (7), for the guidance of exterior component (2) and shaft (4) relative to each other. The side edges (15) and (16) of the strip (8) are discontinuously joined with each other by spot welds. The cage (6) can additionally be equipped with a backup ring (17). The backup ring (17) is supported by the face area (18) of the cage (6). The backup ring support surface (21) serves as a contact surface for a compression spring (19). The other end of the spring is supported by the support surface (20) of a shoulder ring (22) to return the cage (6) to a center or home position. Through the use of a strip (8), the cages (6) may be produced in different diameters and lengths through a simple process.

11 Claims, 3 Drawing Sheets

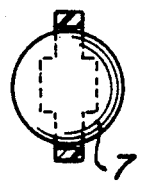
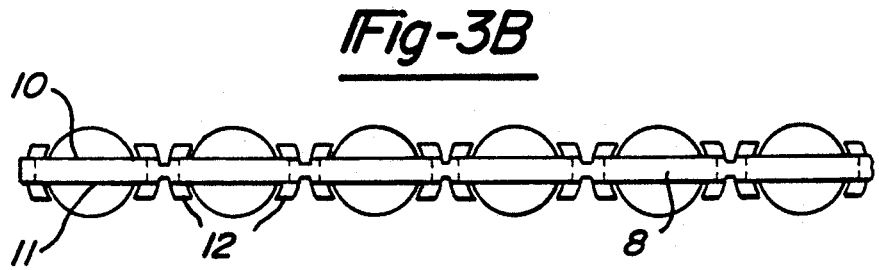
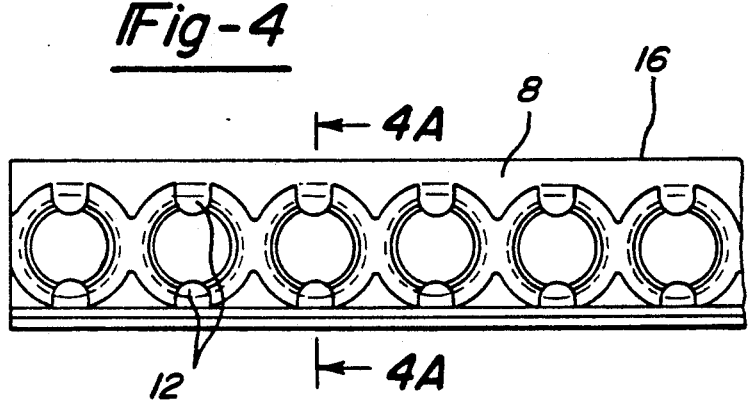
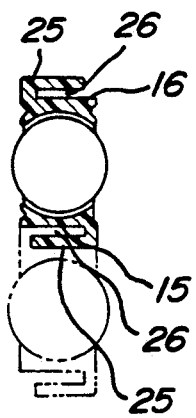
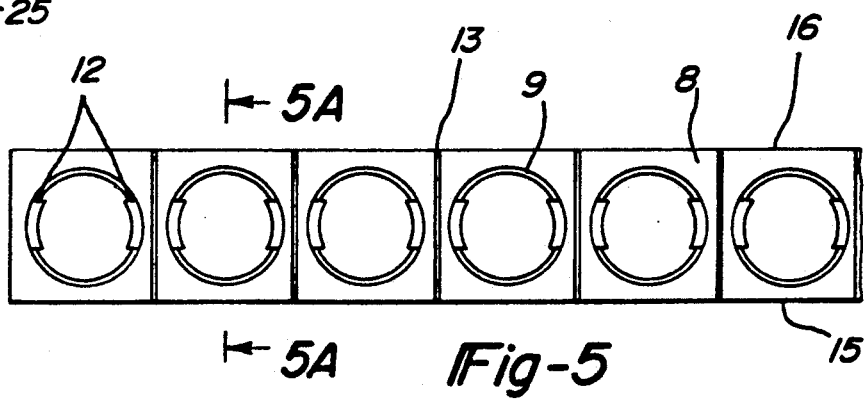

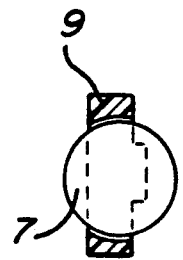
*Fig-5A*
*Fig-5B*
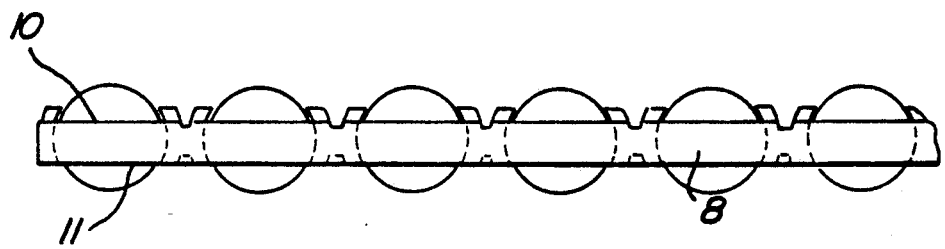
*Fig-6*
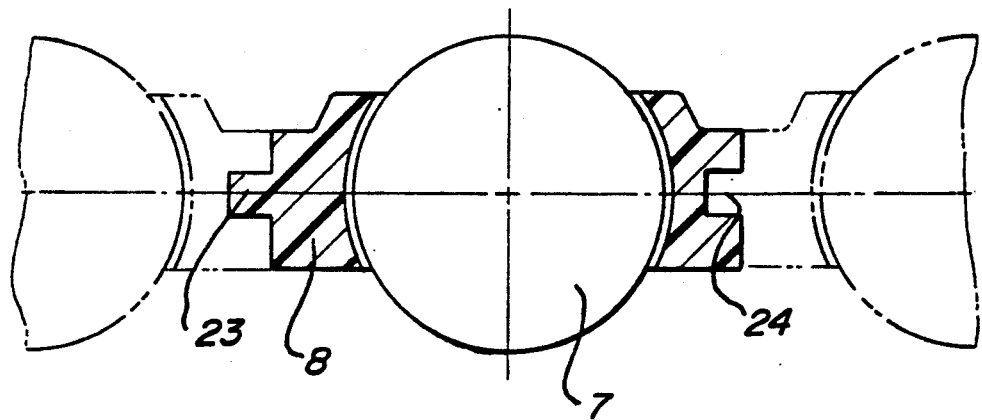

BALL GUIDE

BACKGROUND AND SUMMARY OF THE INVENTION

The present invention relates to a ball guide and, more particularly, to a ball guide having an exterior component with a cylindrical bore; a shaft freely moving inside the bore in an axial and/or rotational direction; balls for rolling motion between the two components; and a hollow cylindrical cage to retain the balls where the cage is a plastic strip with apertures for the balls, and is coiled around the shaft in the shape of a helix.

U.S. Pat. No. 2,566,421 illustrates a strip material with holes to retain the balls. Furthermore, between each two holes, a cross sectional reduction is provided by notches extending perpendicular to the strip axis. The notches enable the thereby created sections to be bent relative to each other. As an alternative, the patent suggests to produce each section holding one ball, as a separate unit, and to join these individual components by welding. The disadvantage of this is that a bearing constructed of several turns of a coil would not constitute a continuous unitary unit. This may be acceptable in cases where the elements are made of steel or other types of metal as, due to the plastic deformation of the joint areas and the material itself, a minimal amount of coherence may still be obtained. This does not apply however, when the choice of materials is plastics.

Swiss Patent 459,672 illustrates a method for the assembly of a cage made of individual rings, which are mutually cemented or interlocked together. Such plastic cages are manufactured either in single-job production or, for larger batch sizes, as injection-molded parts. The required tooling is rather complex, as an appropriate opening must be provided for each individual ball per ring. Moreover, these openings must be configured so that the balls are secured against inward or outward falling out. Furthermore, it is necessary to produce a separate ring for each cage diameter.

As a whole, the manufacture of the previously mentioned variations is expensive. For each diameter the respective cages must be manufactured or kept in stock.

This invention is based on the objective to propose a ball guide with a cage that, in a simple way, is adaptable to various guide diameters and guide lengths, thereby enabling low-cost production, while still having the rigidity required for a quality guide.

The objective is accomplished by this invention in that the adjacent edges of the helically-wound strip are connected with each other. The advantage of this configuration lies in the fact that cages of various guide diameters and guide lengths may be produced from one single strip, by producing a helix, e.g., by helical coiling to form a cylindrical cage. Additionally, due to the coiling technique, a staggered ball pattern is automatically provided in the longitudinal and transverse directions. This pattern results in high dynamic load capacities because each individual ball will roll along a different line of contact with the shaft and with the external component bore. Also, the pattern provides favorable load distribution. In linear operation, due to the spread of contact points over a multitude of contact tracks, the service life is considerably increased. The connecting technique provides the cage with the necessary rigidity to absorb the guide's operating forces.

Additionally, the strip may have a number of serially arranged ball apertures. This provides the strip with a high degree of adaptability. For larger diameters, however, it is also conceivable for the strip to have two or more rows of balls side-by-side, which can be formed into a helix with its edges connected to each other. Here, the ball retention pockets could, e.g., be mutually offset by one half of their spacing. Such strips should preferably be employed for guides of large diameters.

Preferably, the edges of the strips when wound in a helix are discontinuously connected to each other over their entire length. Joining of the materials is preferred by welding. It is however also conceivable to join the edges by interlocking members. An interlocking connection may be accomplished by grooves and projections running the length of the strip edges, or by flanges running parallel to the strip edges, formed recesses on the other strip edge into which the flange on the strip of the next turn will engage. These interlock configurations enable shifting of the strip edges relative to each other to compensate for diameter adaptation.

To retain the balls in the strip, at least one of the two strip surfaces is provided with projecting lugs on both sides of the strip apertures. Additionally, the balls may be snapped into place. Any additional reshaping of the opening edges, as required, e.g., for brass bushings, becomes unnecessary. This also provides an additional advantage. The risky practice of letting the balls free-up themselves in operation, used for cages whose openings require post-process shaping, does not exist. The effect of this becomes even more pronounced as the ball size decreases, because with smaller balls the risk of jamming is greater than with relatively large balls.

The strip design may be such that, starting with the neutral zone in which the ball centers are held, the strip thickness is dimensioned so that the desired envelopment of the balls is provided by the strip itself. As a result, one strip surface has merely holes from which the balls protrude slightly, while the other surface has lugs projecting from it. Lugs may, however, be provided on both surfaces. Preference is given to the smooth surface, i.e., the one having no lugs, for the exterior surface of the cage facing the bore of the external component.

For improved flexibility of the strip, another configuration provides grooves extending across the width of the strip. The grooves are located between successive ball retention apertures. Preferably, the grooves are provided on both surfaces of the strip. A particularly favorable construction is obtained by selecting polyamide as the plastic material for the strip.

The plastic strip can be continuously produced in a simple way by sectional injection-molding using a form tool. The polyamide material provides a homogeneous transition for the connecting points. This permits simplified tooling. The production costs for a cage are thereby considerably reduced compared with cages produced in one tool, either as a bushing section or a bushing of the finished length with all its openings, by means of injection-molding.

Furthermore, as a supplement to the instruction incorporated in this invention, provisions may be included for one backup ring each, adjacent to both face areas of the cage. At least one back up ring serves as a support base for a compression spring. The compression spring is supported on one side by the backup ring and on the other side by the supporting surface of a shoulder ring located either in the external component or in the shaft.

From the following detailed description taken in conjunction with the accompanying drawings and subjoined claims, other objects and advantages of the present invention will become apparent to those skilled in the art.

DETAILED DESCRIPTION OF THE DRAWINGS

FIG. 3A is a sectional view of FIG. 3 along line 3A—3A thereof.

FIG. 3B is a side elevational view of the cage strip of FIG. 3.

FIG. 4 is a plan view of another cage strip in accordance with the present invention.

FIG. 4A is a sectional view of FIG. 4 along line 4A—4A thereof.

FIG. 5 is a plan view of another cage strip in accordance with the present invention.

FIG. 5A is a sectional view of FIG. 5 along line 5A—5A thereof.

FIG. 5B is a side elevation view of the cage strip of FIG. 5.

FIG. 6 is a cross section view of a cage strip showing an alternative embodiment of a cage strip in the present invention.

DETAILED DESCRIPTION OF THE PREFERRED EMBODIMENT

Figure 1:
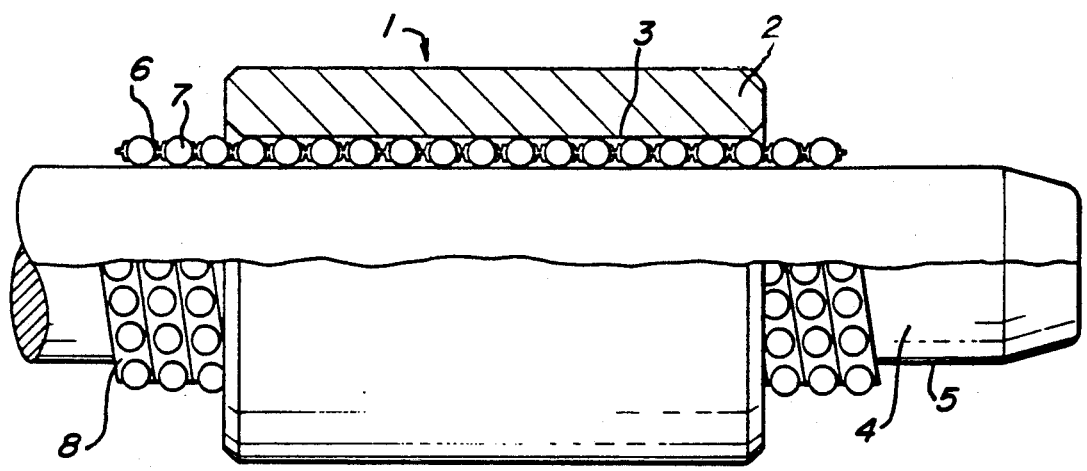
FIG. 1 is an elevation view partially in section of a ball guide in accordance with the present invention.

Turning to FIG. 1, the ball guide 1 includes an exterior component 2 which is configured as a sleeve with a cylindrical bore 3. A shaft 4 is guided, free to move axially and rotationally inside of the bore 3. Relative movements between the external component 2 and shaft 4 is provided by rolling elements in the form of balls 7 located between the external component 2 and shaft 4. The balls are retained in position via cage 6. The cage 6 is wound into a helix to form a cylinder. The cage 6 is positioned about the outside surface 5 of the shaft 4 and is concentric therewith. The balls 7 protrude radially, inward and outward, from cage apertures 9 and are free to roll alongside the walls of the exterior component bore 3 and the shaft outside surface 5. Relative to the exterior component 2 and the shaft 4, the cage 6 travels only one half the excursion of the two relative to each other, either in the longitudinal or rotational direction.

Figure 2:
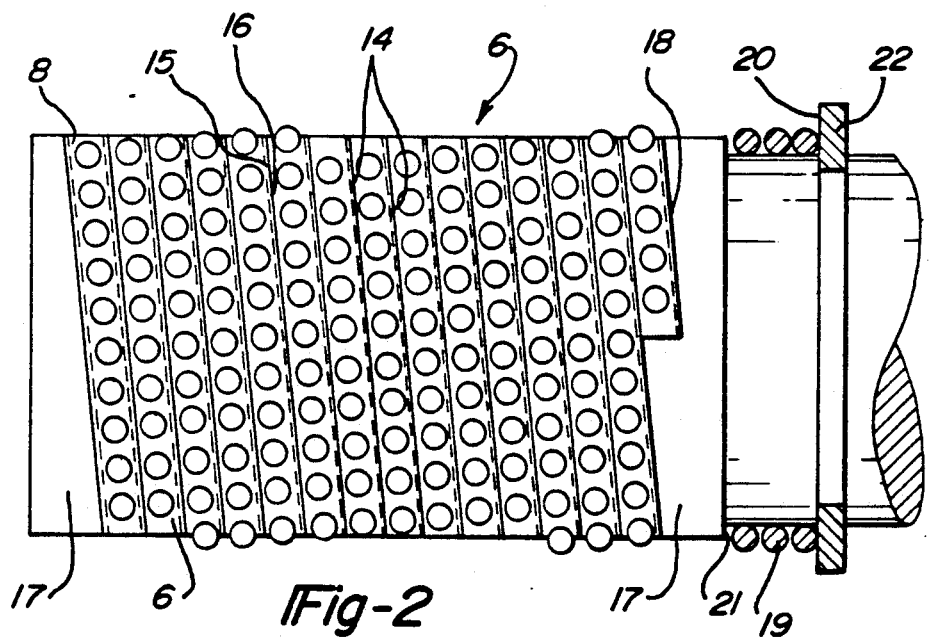
FIG. 2 is a side elevation view of a cage with a shaft, featuring a lateral spring support.
Figure 3:
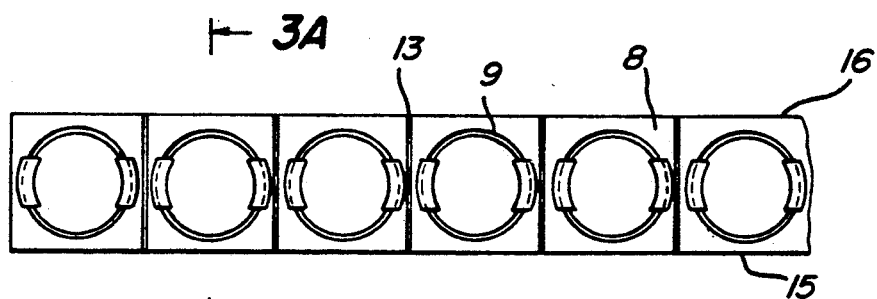
FIG. 3 is a plan view of a cage strip in accordance with the present invention.

From FIGS. 1 and 2 it can be seen that the cage 6 is manufactured from a strip 8 which can be examined in detail, in FIGS. 3, 3A, 3B, 4 and 4A. The strip 8 is manufactured by means of continuous injection-molding and includes a row of spaced apertures 9 to retain the balls 7. Lugs 12 project from the two surfaces 10 and 11 on both sides of the apertures 9. The lugs partially envelop the balls 7 and protect them from falling out of the cage 6. The strip 8 is coiled to a helix in a spiral fashion. The longitudinal edges 15 and 16 of the strip 8 are discontinuously, materially joined by spot welds 14, thereby forming an integral cage 6. To facilitate bending and coiling of the strip 8, grooves 13 are provided between each successive apertures 9 in the surfaces 10 and 11 of the strip 8. The grooves extend across the entire width of the strip with the grooves reducing the cross section of the strip 9 and supporting the adaptation process.

For situations where the cage 6 of a ball guide must be returned to a center position, backup rings 17 are provided adjacent the ends of the lateral face areas 18 of the cage 6. These rings may also be joined with the longitudinal edges 15 of the strip 8 by spot welds. The backup rings 17 provide support surfaces 21 for compression spring 19 which, at its other end, is supported by the support surface 20 of a shoulder ring 22 which is on either shaft 4 as shown, or to the external component 2. The spring 19 returns the cage 6 to a centered position.

The strip 8 is preferably manufactured from a polyamide plastic material. This type of plastic lends itself particularly favorably to injection-molding of a continuous strip 8. Furthermore, it provides the necessary rigidity required for the cage 6 after joining the longitudinal edges 15 and 16 of the strip 8 by spot welds. The spot welds are points at the edges of the plastic material which have been melted together with one another.

The variation of a case strip 8 can be seen, particularly from the cross sectional view of FIG. 4A. In FIGS. 4 and 4A, the cage 6 is shown with a flange 25 on the strip edges 15 and/or 16, with appropriate spacing. Together with the strip edges 15 and 16, the flanges 25 form grooves 26 into which, during coiling, the flange 25 of the next turn of the strip 8 is engaged, as shown in the sectional view of FIG. 4A. In the process, the grooves 26 will open up toward the opposite surfaces of the strip 8 to receive the flange 25.

An alternative variation regarding centering of adjacent edges 15 and 16 of the cage strip 8 can be seen in FIG. 6. Accordingly, one of the strip edges is provided with a centering tab 23 extending along the strip edge, while the other strip edge features a corresponding groove 24. The connection between centering tab 23 and groove 24, or flange 25 and groove 26, can additionally be secured by means of cementing, welding, etc.

FIGS. 5, 5A and 5B show an alternative configuration of the strip 8 where projecting lugs 12 are provided only on the surface 10. The captivation of the balls 7 is accomplished, on the one hand, by the lugs 12 and, on the other hand, by the contour fit of the apertures 9 in strip 8, where the strip 8, starting from the neutral or center layer, increases in thickness more toward surface 11 than to surface 10 which features the lugs 12 as seen in FIGS. 5A and 5B. Preferably, the surface 11 is to be used facing outward after coiling of cage 6, as it provides a smoother surface.

While the above detailed description describes the preferred embodiment of the present invention, the invention is susceptible to modification, variation, and alteration without deviating from the scope and fair meaning of the subjoined claims.

We claim:

1. A ball guide comprising:
   an exterior component defining a cylindrical bore;
   a shaft positioned concentrically within said bore, said shaft being freely movably in an axial and rotation direction within said bore;
   a plurality of balls positioned between said exterior component and said shaft for providing rolling movement between the two;
   a cage for retaining said plurality of balls in position between said exterior component and said shaft, said cage being an elongated plastic strip having a plurality of apertures for receiving said balls and said strip being helically wound to form a cylinder about said shaft; and means for connecting adjacent edges of said strip with one another to maintain said strip in said cylindrical configuration.

2. The ball guide according to claim 1 wherein said strip has a number of serially arranged apertures for retaining the balls.

3. The ball guide according to claim 1 wherein said edges are discontinuously connected to each other over their entire length when in said cylindrical configuration.

4. The ball guide according to claim 1 wherein said edges are materially joined with each other.

5. The ball guide according to claim 4 wherein said material joining includes a plurality of spot welds welding said edges with each other.

6. The ball guide according to claim 1 wherein said connecting means includes interlocking members on said edges for interlocking said edges with each other when in said cylindrical configuration.

7. The ball guide according to claim 1 wherein said strip includes a plurality of lugs projecting form at least one of the two surfaces of the strip for retaining the balls on both sides of the apertures.

8. The ball guide according to claim 1 wherein a plurality of grooves extend across the width of said strip between successive apertures.

9. The ball guide according to claim 1 wherein said strip is manufactured from polyamide.

10. The ball guide according to claim 1 wherein said strip is continuously manufactured in a form tool by means of sectional injection-molding.

11. The ball guide according to claim 1 wherein either side of said cage in its cylindrical configuration may include a backup ring to provide a support base for a compression spring which, at its other end, is supported by a support surface of a shoulder ring located in the exterior component or the shaft.

* * * * *